(12) United States Patent
Roberts et al.

(10) Patent No.: US 8,518,266 B2
(45) Date of Patent: Aug. 27, 2013

(54) DISSOLVED AIR FLOTATION CLARIFIER

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 807 days.

(21) Appl. No.: 12/591,320

(22) Filed: Nov. 16, 2009

(65) Prior Publication Data
US 2011/0114565 A1 May 19, 2011

(51) Int. Cl.
C02F 1/24 (2006.01)

(52) U.S. Cl.
USPC .................................. 210/703; 210/221.2

(58) Field of Classification Search
USPC ................... 210/221.1, 221.2, 703
See application file for complete search history.

(56) References Cited

U.S. PATENT DOCUMENTS

| | | | |
|---|---|---|---|
| 3,117,082 A * | 1/1964 | Schluter | 210/195.1 |
| 3,506,125 A | 4/1970 | Willis et al. | |
| 4,160,737 A * | 7/1979 | Pielkenrood | 210/202 |
| 4,280,886 A | 7/1981 | Sawa et al. | |
| 4,377,485 A | 3/1983 | Krofta | |
| 4,470,903 A | 9/1984 | van Leeuwen | |
| 4,626,345 A | 12/1986 | Krofta | |
| 4,681,682 A | 7/1987 | White et al. | |
| 4,957,633 A | 9/1990 | Suutarinen | |
| 5,064,531 A | 11/1991 | Wang et al. | |
| 5,068,031 A | 11/1991 | Wang et al. | |
| 5,069,783 A | 12/1991 | Wang et al. | |
| 5,130,029 A | 7/1992 | Suutarinen | |
| 5,516,433 A | 5/1996 | Suutarinen | |
| 5,766,484 A * | 6/1998 | Petit et al. | 210/703 |
| 6,217,777 B1 * | 4/2001 | Dahlquist et al. | 210/703 |
| 6,635,177 B2 | 10/2003 | Oswald et al. | |
| 7,169,301 B2 | 1/2007 | Vion | |
| 7,445,709 B2 * | 11/2008 | Beaule et al. | 210/221.2 |

OTHER PUBLICATIONS

Tekes, Water Services 1997-2001 Technology Programme Report, Jun. 2002.
Infilco AQUADAF Clarifier, Mar. 2009.
Enpure, Flotation 2007, presented Sep. 13, 2009.
Excerpts from Corix Water Systems web page, Nov. 12, 2009.

* cited by examiner

Primary Examiner — Thomas M Lithgow
(74) Attorney, Agent, or Firm — Merek, Blackmon & Voorhess, LLC (57) ABSTRACT

A dissolved air flotation clarifier for removing impurities from a liquid to be clarified. The dissolved air flotation clarifier includes a housing having an inlet for receiving a liquid to be clarified. The housing further includes a reaction zone, a clarification zone and an effluent channel. The reaction zone has at least one saturated water distributor and at least one dissolved air flotation nozzle operably connected to the at least one saturated water distributor to receive saturated water from the at least one saturated water distributor. The dissolved air flotation nozzle is configured to release micro-bubbles from a saturated water so that the micro-bubbles can mix with the liquid to be clarified to remove impurities from the liquid to be clarified. The clarification zone includes a flow control member for controlling the flow of the mixture of micro-bubbles and liquid in the clarification zone to ensure that the area surrounding the inlet to the effluent channel has little or no micro-bubbles to prevent or significantly reduce micro-bubbles from becoming entrained in a clarified liquid passing through the effluent channel.

19 Claims, 7 Drawing Sheets

DISSOLVED AIR FLOTATION CLARIFIER

FIELD OF THE INVENTION

The present invention is directed to a clarifier for removing impurities from a liquid including but not limited to water and/or wastewater. More specifically, the present invention is directed to a clarifier that employs dissolved air flotation to remove impurities from a liquid. The clarifier of the present invention may be used with one or more flocculators upstream of the clarifier. The clarifier of the present invention may also be used with one or more additional filter systems downstream of the clarifier including but not limited to filters using granular media or membranes.

BACKGROUND OF THE INVENTION

Clarifiers using dissolved air flotation (DAF) to remove impurities from water or wastewater are known. As used herein, the term clarifier includes any device that removes impurities from a liquid including but not limited to roughing filters or polishing filters.

Figure 1:
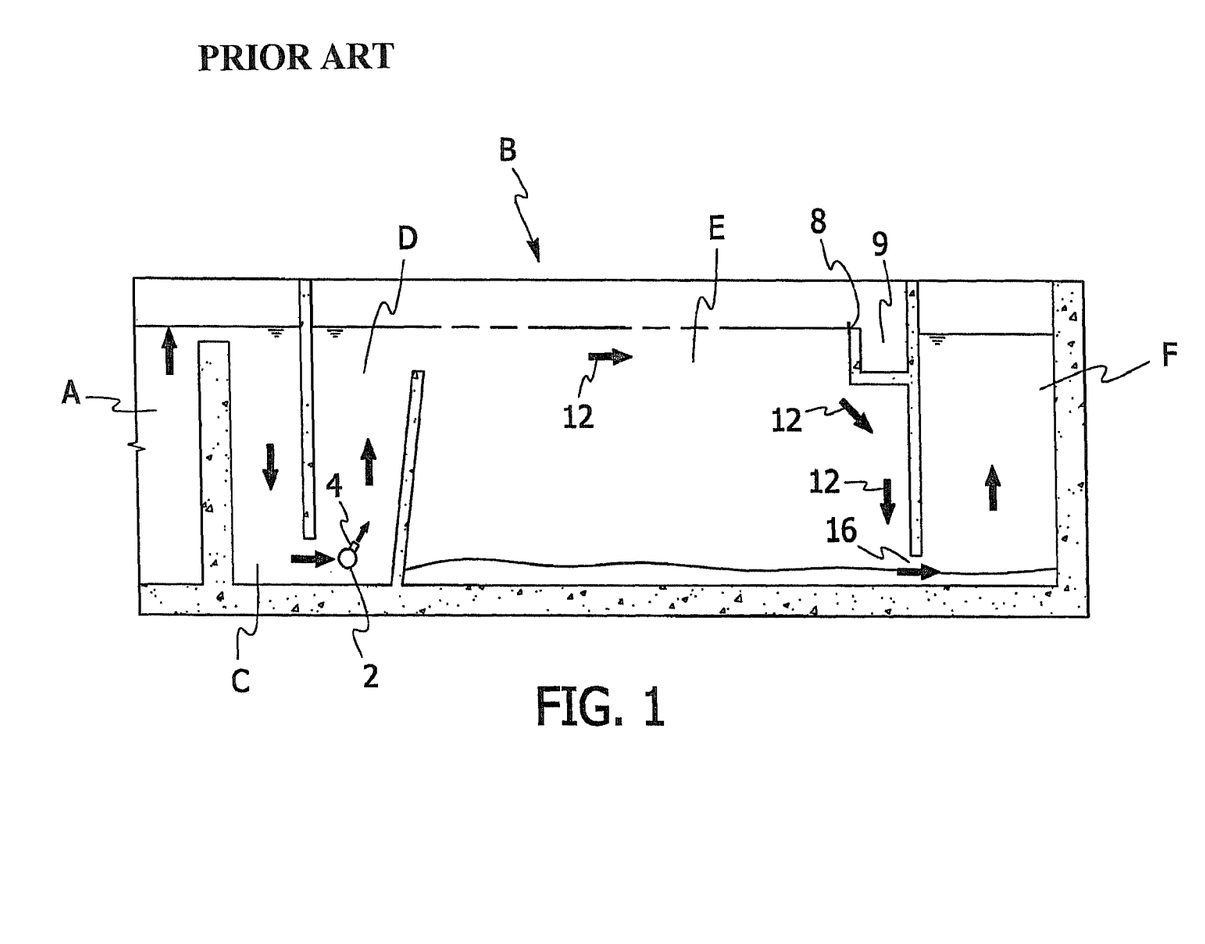
FIG. 1 is a cross-sectional elevational view of a prior art DAF clarification system.
Figure 2:
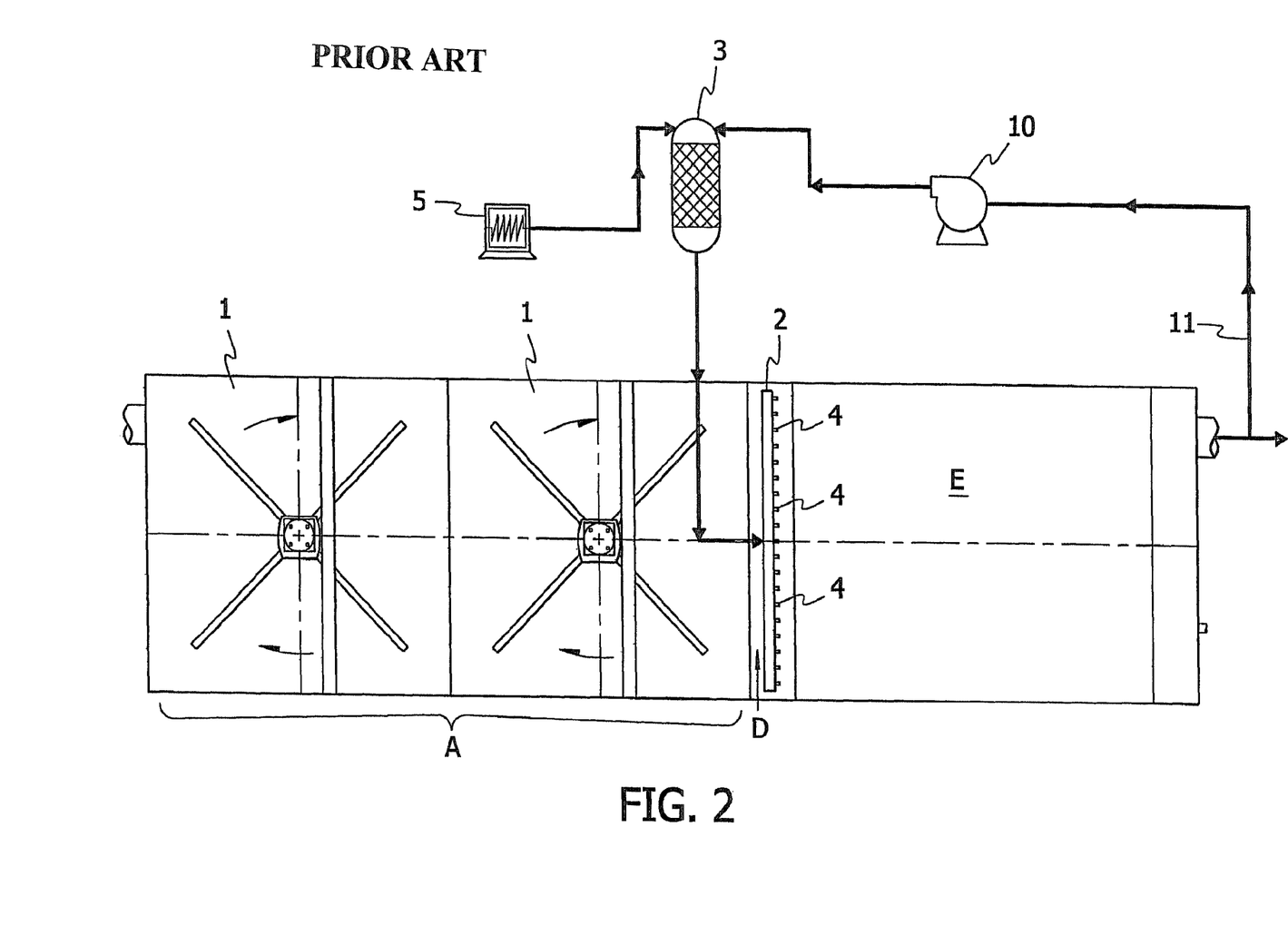
FIG. 2 is a plan view of a prior art DAF clarification system.

A typical prior art DAF basin is illustrated in FIGS. 1 and 2. A flocculator A is employed with the clarifier B. The flocculator A may contain one or more flocculation zones (two flocculation zones 1 are shown in FIG. 2). Typically, a coagulant is added to the liquid to be filtered prior to entry into the flocculator A. The coagulant acts to destabilize the colloidal particles which facilitates their agglomeration in the flocculator A. Once the liquid passes upwardly through the flocculator A it travels downwardly though the inlet chamber or zone C. The liquid subsequently passes into the reaction zone D. A saturated water distributor 2 is located adjacent the bottom of the reaction zone D. As shown in FIG. 2, the distributor 2 is connected to a saturator 3 which is connected to an air compressor 5. The saturator provides water saturated with air to the distributor 2. A plurality of DAF nozzles 4 extend from distributor 2.

The saturated water flowing through the distributor 2 is depressurized as it passes through the DAF nozzles 4 thereby creating a multitude of micro-bubbles that mix with the liquid to be clarified in the reaction zone D. The flocculated particulate in the liquid to be clarified agglomerates with the micro-bubbles and forms a thick layer of sludge on the surface of the clarification zone E. The clarified liquid subsequently passes into the effluent channel F. When the layer of sludge (or float) sufficiently builds up, it can be removed by a variety of mechanical and hydraulic means. In this example, a desludge valve opens dropping the level in the desludge chamber 9 thereby allowing the sludge layer or float to flow over weir 8 into desludge chamber 9.

Typically, a recycle pump 10 is connected to the effluent channel F via recycle line 11 to recycle a portion of the clarified liquid, i.e., a portion of the clarified liquid is fed back to the saturator 3. A significant problem has been encountered by a number of previously known DAF clarifiers when the flow rate is increased above 8 to 10 gpm/sq.ft. Specifically, micro-bubbles become entrained in the clarified liquid traveling through the effluent channel F. As shown in FIG. 1, this occurs because the flow conditions in the clarification zone E (see arrows 12) are such that the lower edge 14 (represented by solid curved line in clarification zone K in FIG. 1) of the "white water" (i.e., a mixture of micro-bubbles and liquid to be clarified) extends below the inlet 16 of the effluent channel F during higher filtration rates allowing the micro-bubbles to readily pass into the effluent channel F. One previously known solution to this problem is to significantly increase the height of the clarifier in order to raise the lower edge of the white water to above the inlet 16 of the effluent channel F. However, this is extremely undesirable because it significantly increases the size and cost of the clarifier.

OBJECTS AND SUMMARY OF THE INVENTION

An object of the present invention is to provide a novel and unobvious dissolved air flotation clarifier.

Another object of a preferred embodiment of the present invention is to provide a dissolved air flotation clarifier that can operate at high flow rates without encountering entrained micro-bubbles in the effluent.

A further object of a preferred embodiment of the present invention is to provide a dissolved air flotation clarifier that prevents or significantly reduces the entrainment of micro-bubbles in the effluent without requiring the height of the clarified to be increased.

Yet another object of a preferred embodiment of the present invention is to provide a dissolved air flotation clarifier where the flow conditions in the clarification zone are such that the lower edge of white water is positioned above the inlet to the effluent channel.

Still another object of a preferred embodiment of the present invention is to provide a dissolved air flotation clarifier that is relatively inexpensive to construct.

Yet still another object of a preferred embodiment of the present invention is to provide a dissolved air flotation clarifier that increases the efficiency of the saturator by removing a portion of liquid and micro-bubbles from a portion of the clarifier and directing the same to the saturator.

Still another object of a preferred embodiment of the present invention is to provide a dissolved air flotation clarifier that obviates the need for a false bottom construction in the clarifier.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a dissolved air flotation clarifier for removing impurities from a liquid to be clarified. The dissolved air flotation clarifier includes a housing having an inlet for receiving a liquid to be clarified. The housing further includes a reaction zone, a clarification zone and an effluent channel. The reaction zone has at least one saturated water distributor and at least one dissolved air flotation nozzle operably connected to the at least one saturated water distributor to receive saturated water from the at least one saturated water distributor. The dissolved air flotation nozzle is configured to release micro-bubbles from a saturated water so that the micro-bubbles can mix with the liquid to be clarified to remove impurities from the liquid to be clarified. The clarification zone includes flow control means for controlling the flow of the mixture of micro-bubbles and liquid in the clarification zone to ensure that a lower edge of white water is disposed above an inlet to the effluent channel to prevent micro-bubbles from being entrained in a clarified liquid passing through the effluent channel.

Another embodiment of the present invention is direct to a dissolved air flotation clarifier for removing impurities from a liquid to be clarified. The dissolved air flotation clarifier includes a housing having an inlet for receiving liquid to be clarified. The housing further includes a reaction zone, a clarification zone and an effluent channel. The reaction zone has at least one saturated water distributor and at least one dissolved air flotation nozzle operably connected to the at least one saturated water distributor to receive saturated water from the at least one saturated water distributor. The dissolved air flotation nozzle is configured to release micro-bubbles from the saturated water so that the micro-bubbles can mix with the liquid to be clarified to remove impurities from the liquid to be clarified. At least one recycle header is disposed in the clarification zone for removing a portion of liquid from the clarification zone so that the portion of liquid can be directed to a saturator operably connected to the at least one saturated water distributor.

A further embodiment of the present invention is directed to a dissolved air flotation clarifier for removing impurities from a liquid to be clarified. The dissolved air flotation clarifier includes a housing having an inlet for receiving a liquid to be clarified. The housing further includes a reaction zone, a clarification zone and an effluent channel. The reaction zone has at least one saturated water distributor and at least one dissolved air flotation nozzle operably connected to the at least one saturated water distributor to receive saturated water from the at least one saturated water distributor. The dissolved air flotation nozzle being configured to release micro-bubbles from the saturated water so that the micro-bubbles can mix with the liquid to be clarified to remove impurities from the liquid to be clarified. The clarification zone is formed by at least first and second walls. The first wall is disposed on one side of the clarification zone and the second wall is disposed on an opposite side of the clarification zone. The first wall is disposed adjacent the reaction zone. A baffle is disposed in the clarification zone to re-direct flow of micro-bubbles and liquid toward the first wall.

Still another embodiment of the present invention is directed to a method of clarifying a liquid with a dissolved air flotation clarifier for removing impurities from the liquid to be clarified. The method includes the steps of: (a) providing a housing having an inlet for receiving liquid to be clarified, the housing further having a reaction zone, a clarification zone and an effluent channel; (b) providing the reaction zone with at least one saturated water distributor and at least one dissolved air flotation nozzle operably connected to the at least one saturated water distributor to receive saturated water from the at least one saturated water distributor, the dissolved air flotation nozzle being configured to release micro-bubbles from the saturated water so that the micro-bubbles can mix with the liquid to be clarified to remove impurities from the liquid to be clarified; and, (c) providing a conduit for removing a portion of liquid and micro-bubbles from the clarification zone upstream of the effluent channel.

DETAILED DESCRIPTION OF THE PREFERRED EMBODIMENTS OF THE INVENTION

The preferred forms of the invention will now be described with reference to FIGS. 3-7. The appended claims are not limited to the preferred forms and no term and/or phrase used herein is to be given a meaning other than its ordinary meaning unless it is expressly stated otherwise.

Figure 3:
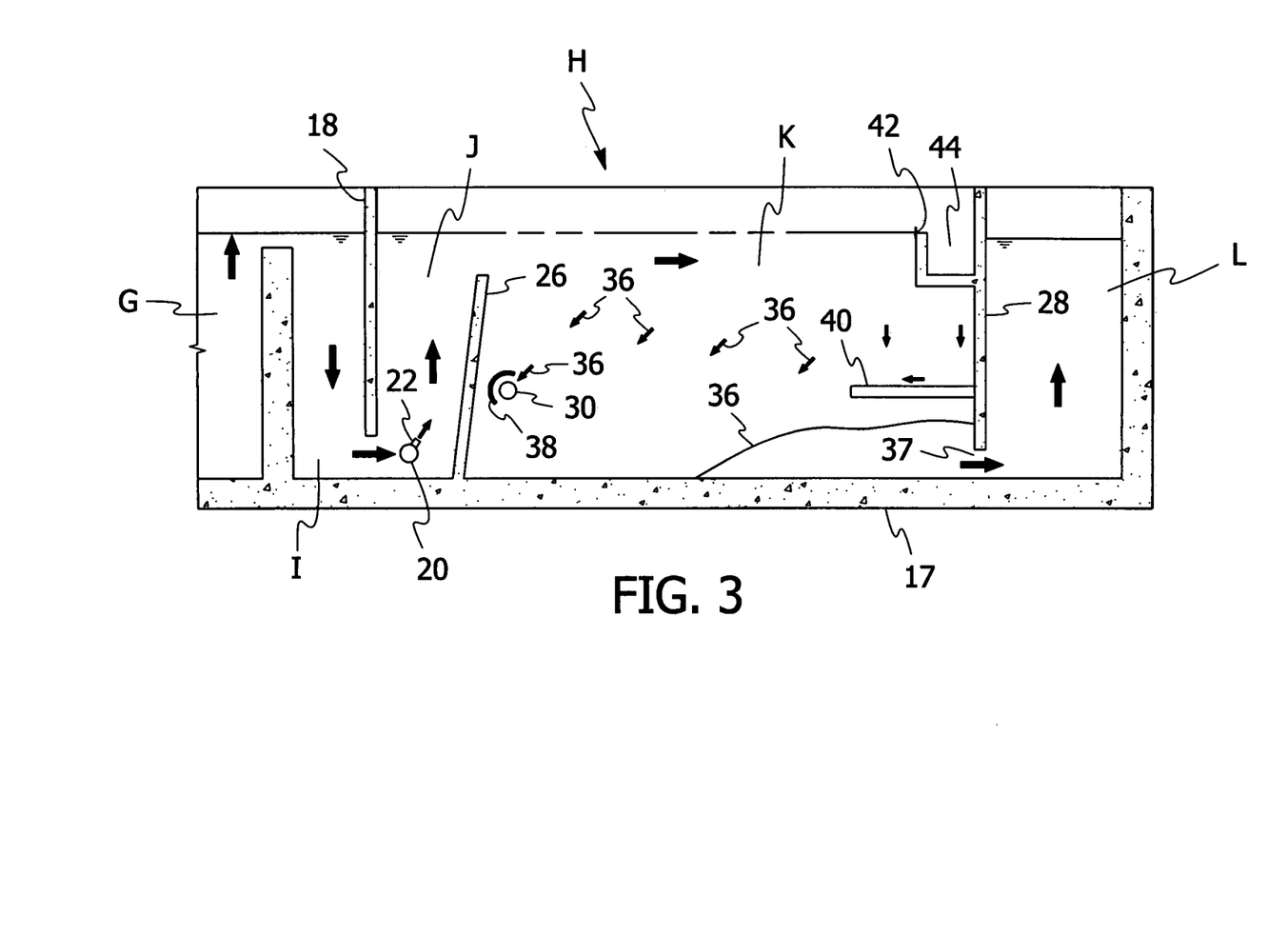
FIG. 3 is a cross-sectional elevational view of a DAF clarification system formed in accordance with a preferred embodiment of the present invention.
Figure 4:
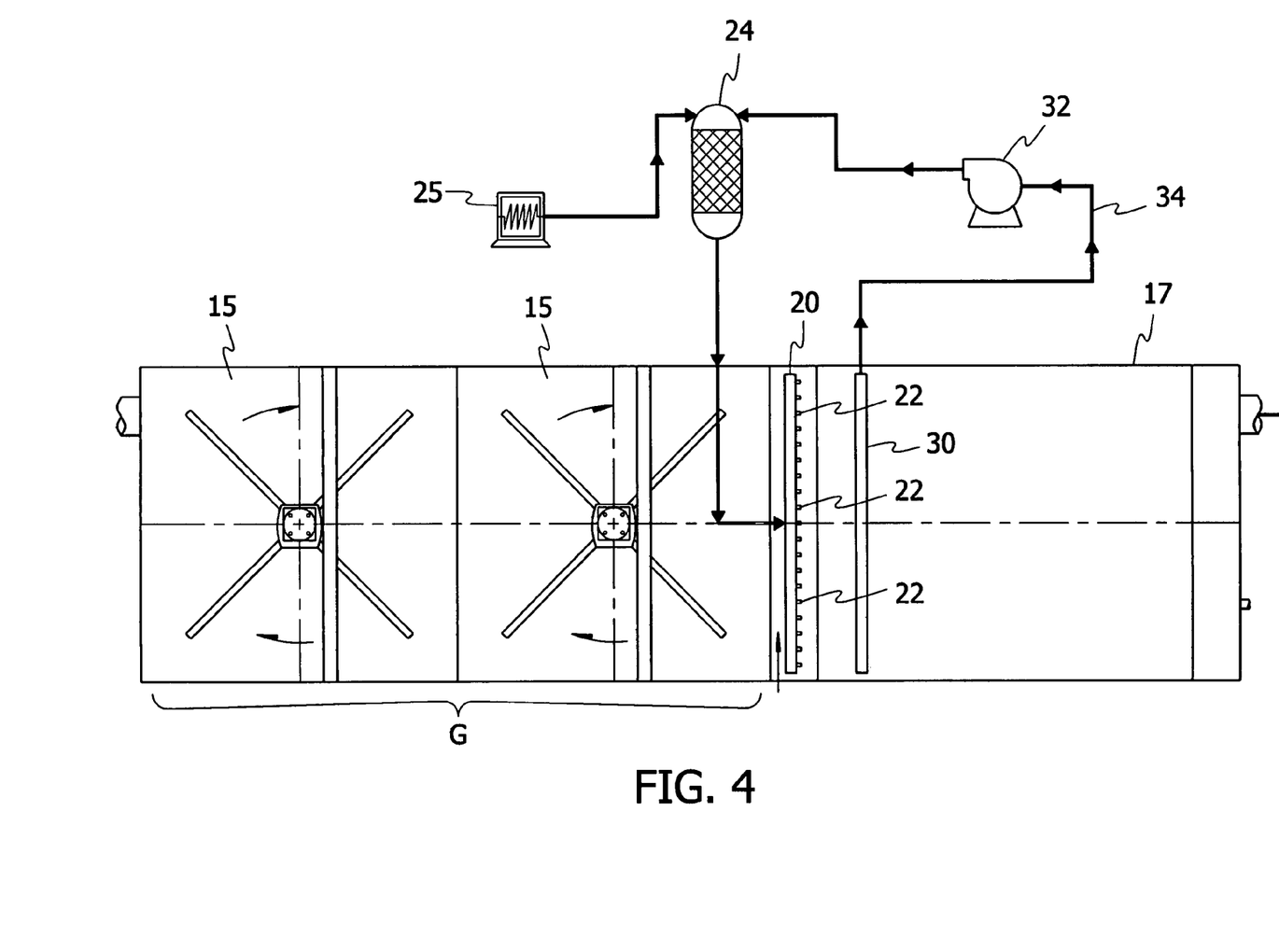
FIG. 4 is a plan view of a DAF clarification system illustrated in FIG. 3.
Figure 5:
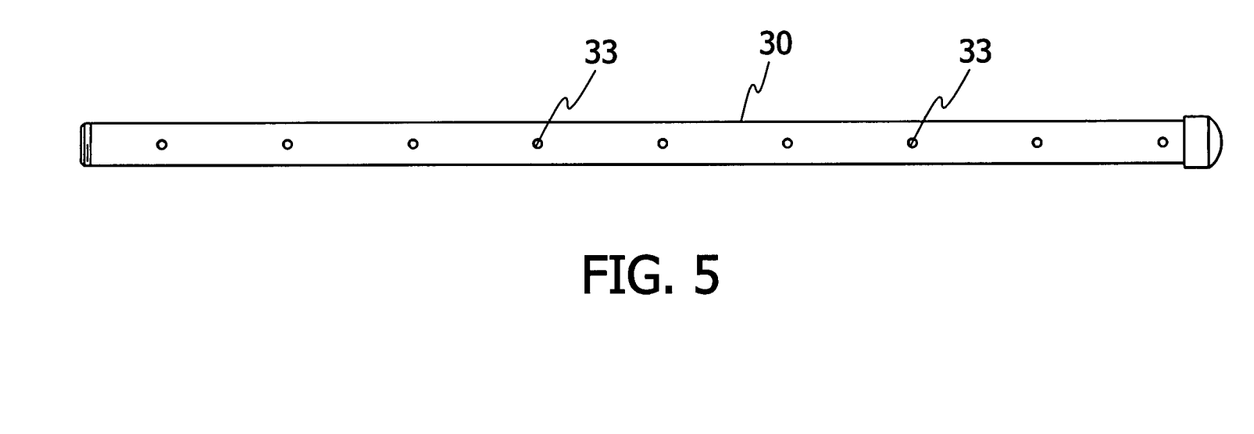
FIG. 5 is a plan view of a preferred form of flow control means for controlling the flow of the mixture of micro-bubbles and liquid in the clarification zone to ensure that a lower edge of white water is disposed above an inlet to the effluent channel to prevent micro-bubbles from being entrained in a clarified liquid passing through the effluent channel.

FIGS. 3 Through 5

Referring to FIGS. 3 to 5, a preferred form of DAF clarification system includes a flocculator G located upstream of clarifier H. The flocculator G may contain one or more flocculation zones (two flocculation zones 15 are shown in FIG. 4). It should be noted that any suitable flocculator can be used. A coagulant may be added to the liquid to be filtered prior to entry into the flocculator G to destabilize the colloidal particles which facilitates their agglomeration in the flocculator G. Preferably, the clarifier H includes a housing 17 forming an inlet chamber or zone I, a reaction chamber or zone J, a clarification chamber or zone K and an effluent channel L. As used herein, "effluent channel" means any structure that collects or receives effluent from the clarification zone. While the housing is shown as being rectangular in configuration, it will be readily appreciated that the configuration of the housing can be readily varied as desired.

As shown in FIG. 3, a wall 18 separates zone I from zone J. As shown by the arrows in FIG. 3, influent or liquid to be clarified passes upwardly through the flocculator G and downwardly through inlet zone I. Subsequently, the liquid travels under the lowermost edge of wall 18 into reaction zone J. A saturated water header 20 is disposed in the lower portion of reaction zone J. As shown in FIG. 4, a plurality of DAF nozzles 22 extend from header 20. A saturator 24 is connected to header 20 to provide water saturated with air to header 20. Air compressor 25 is connected to saturator 24. As the liquid to be clarified passes into the reaction zone J, micro-bubbles are formed by the depressurization of the saturated liquid as it passes through the DAF nozzles 22. The micro-bubbles mix with the liquid to be clarified in the reaction zone J. The flocculated particulate in the liquid to be clarified agglomerates with the micro-bubbles and forms a thick layer of sludge on the surface of the clarification zone K.

Inclined wall 26 separates reaction zone J and clarification zone K. Wall 28 is disposed opposite inclined wall 26 and separates clarification zone K from effluent channel L. A header 30 is disposed in clarification zone K. Preferably, header 30 is disposed in zone K directly adjacent wall 26 and removed from wall 28. Referring to FIG. 4, header 30 is connected to recycle pump 32 via recycle line 34. Referring to FIG. 5, header 30 includes a plurality of uniformly spaced orifices 33.

During filtration, a portion of liquid and/or micro-bubbles are removed from the clarification zone K and fed to saturator 24 via header 30, recycle pump 32 and line 34. Header 30 serves as a flow control means for controlling the flow of the mixture of micro-bubbles and/or liquid in the clarification zone K. Specifically, header 30 changes the flow conditions (See arrows 36 in FIG. 3 and compare with flow conditions in FIG. 1) in the clarification zone K such that the lower edge 36 (represented by solid curved line in clarification zone K in FIG. 3) of white water (i.e., mixture of liquid and micro-bubbles) adjacent effluent channel L is disposed above inlet 37 to prevent micro-bubbles from becoming entrained in the clarified liquid passing through the effluent channel K. More specifically, the area below the solid curved line in FIG. 3 representing the lower edge 36 has little or no micro-bubbles. In this fashion, an area is formed surrounding inlet 37 having little or no micro-bubbles. In addition to improving the flow conditions in clarification zone K by recycling a mixture of liquid and/or micro-bubbles from clarification zone K back to saturator 24 via header 30, recycle pump 32 and line 34, the efficiency of the saturator 24 is improved.

A deflector 38 may be used with header 30 to obtain the desired flow conditions in clarification zone K. Preferably, deflector 38 is arcuate. It will be readily understood that the orientation of deflector 38 and header 30 may be varied as desired. A baffle 40 may be used to obtain the desired flow conditions in place of or with header 30. Baffle 40 also serves as a flow control means for controlling the flow of the mixture of micro-bubbles and liquid in the clarification zone K such that the lower edge 36 of white water adjacent effluent channel L is disposed above inlet 37 to prevent micro-bubbles from becoming entrained in the clarified liquid passing through the effluent channel K. Preferably, baffle 40 extends generally horizontally from wall 28. Preferably, baffle 40 is a solid wall free of openings or orifices. The flow control means of this preferred embodiment prevent or at the very least significantly reduce the entrainment of micro-bubbles in the effluent passing through effluent channel L.

Impurities in the influent are agglomerated with the micro-bubbles and form a sludge layer on the top surface of the clarification zone K. When the layer of sludge (or float) sufficiently builds up, it can be removed by a variety of mechanical and hydraulic means. For example, a desludge valve can be provided. When the desludge valve is opened, the level in the desludge chamber 9 is dropped allowing the sludge layer or float to flow over desludge weir 42 into desludge chamber 44.

Figure 6:
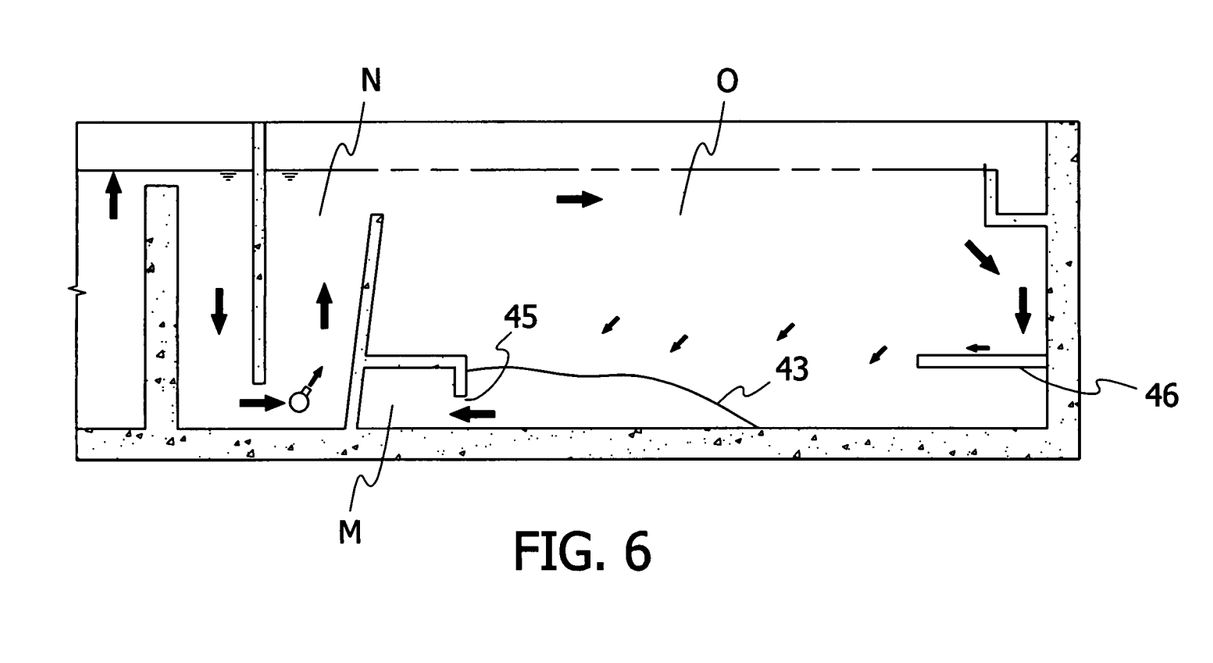
FIG. 6 is a cross-sectional elevational view of a DAF clarification system formed in accordance with a second preferred embodiment of the present invention.

FIG. 6

FIG. 6 illustrates another preferred embodiment which is similar to the embodiment illustrated in FIGS. 3 to 5, and, therefore, only the differences will be described in detail. Specifically, the header and deflector baffle have been omitted and the location of effluent channel has been changed. It should be noted however, that a header 30 and deflector 38 similar to those illustrated in FIGS. 3 to 5 may be used in this embodiment.

As seen in FIG. 6, effluent channel M has been located directly adjacent the reaction zone N. In this manner, effluent channel M serves as flow control means to ensure the proper flow conditions in clarification zone O, i.e., the lower edge 43 (represented by the solid line in FIG. 6) of white water is disposed above the inlet 45. The superior flow conditions can be readily seen when comparing the flow conditions in FIG. 1 with the flow conditions in FIG. 6. It should be noted that baffle 46 is of a similar construction to baffle 40. It should be further understood that baffle 46 may be omitted.

Figure 7:
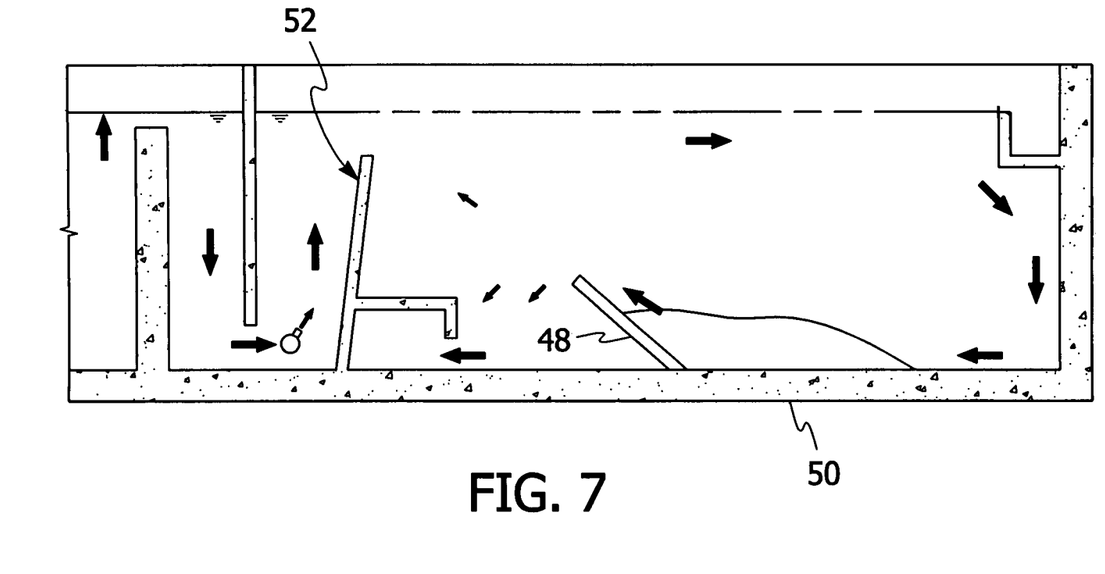
FIG. 7 is a cross-sectional elevational view of a DAF clarification system formed in accordance with a third preferred embodiment of the present invention.

FIG. 7

The embodiment in FIG. 7 is similar to the embodiment in FIG. 6 and, therefore, only the differences will be described in detail. Baffle 48 extending from the bottom of housing 50 in the direction of wall 52 has been provided as an alternative type of flow control means.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A dissolved air flotation clarifier for removing impurities from a liquid to be clarified, said dissolved air flotation clarifier comprising:
    (a) a housing having an inlet for receiving a liquid to be clarified, said housing further having a reaction zone, a clarification zone and an effluent channel;
    (b) said reaction zone having at least one saturated water distributor and at least one dissolved air flotation nozzle operably connected to said at least one saturated water distributor to receive saturated water from said at least one saturated water distributor, said dissolved air flotation nozzle being configured to release micro-bubbles from a saturated water so that the micro-bubbles can mix with the liquid to be clarified to remove impurities from the liquid to be clarified; and,
    (c) said clarification zone including flow control means for controlling the flow of the mixture of micro-bubbles and liquid in the clarification zone to ensure that a lower edge of white water is disposed above an inlet to said effluent channel to prevent micro-bubbles from being entrained in a clarified liquid passing through said effluent channel, said flow control means includes at least one recycle header disposed in said clarification zone for removing a portion of liquid from said clarification zone so that said portion of liquid can be directed to a saturator operably connected to said at least one saturated water distributor.

2. A dissolved air flotation clarifier as set forth in claim 1, wherein:
    (a) said housing further includes an internal wall for separating said reaction zone and said clarification zone; and,
    (b) said flow control means includes said effluent channel being disposed directly adjacent said internal wall to create a flow condition in said clarification zone where a lower edge of white water is disposed above said inlet of said effluent channel to prevent micro-bubbles from being entrained in a clarified liquid passing through said effluent channel.

3. A dissolved air flotation clarifier as set forth in claim 2, wherein:
    (a) said clarification zone includes a horizontally extending baffle positioned on a side opposite of said effluent channel.

4. A dissolved air flotation clarifier as set forth in claim 2, wherein:
    (a) said internal wall is oriented relative to a bottom of said housing such that an internal angle of less than ninety degrees is formed by said internal wall and said bottom of said housing.

5. A dissolved air flotation clarifier as set forth in claim 1, wherein:
    (a) said at least one deflector baffle is arcuate.

6. A dissolved air flotation clarifier as set forth in claim 4, wherein:

(a) said flow control means further includes at least one deflector baffle operably associated with said at least one recycle header.

7. A dissolved air flotation clarifier as set forth in claim 1, wherein:
   (a) said housing further includes an internal wall for separating said reaction zone and said clarification zone; and,
   (b) at least a portion of said at least one deflector baffle is disposed between said recycle header and said internal wall.

8. A dissolved air flotation clarifier for removing impurities from a liquid to be clarified, said dissolved air flotation clarifier comprising:
   (a) a housing having an inlet for receiving liquid to be clarified, said housing further having a reaction zone, a clarification zone and an effluent channel, said clarification zone is defined by at least first and second walls, said first wall is disposed adjacent said reaction zone, said second wall is disposed opposite from said first wall;
   (b) said reaction zone having at least one saturated water distributor and at least one dissolved air flotation nozzle operably connected to said at least one saturated water distributor to receive saturated water from said at least one saturated water distributor, said dissolved air flotation nozzle being configured to release micro-bubbles from the saturated water so that the micro-bubbles can mix with the liquid to be clarified to remove impurities from the liquid to be clarified; and,
   (c) at least one recycle header disposed in said clarification zone for removing a portion of liquid from said clarification zone so that said portion of liquid can be directed to a saturator operably connected to said at least one saturated water distributor, said recycle header is disposed adjacent said first wall and removed from said second wall.

9. A dissolved air flotation clarifier as set forth in claim 8, wherein:
   (a) said at least one recycle header includes a plurality of uniformly spaced orifices.

10. A dissolved air flotation clarifier as set forth in claim 8, wherein:
    (a) said recycle header extends substantially the entire width of said clarification zone.

11. A dissolved air flotation clarifier as set forth in claim 8, wherein:
    (a) said first wall extends upwardly from a bottom of said housing, said first wall includes a top edge; and,
    (b) said recycle header is disposed above said bottom of said housing and below said top edge of said first wall.

12. A dissolved air flotation clarifier as set forth in claim 11, wherein:
    (a) said recycle header is disposed above an inlet of said effluent channel.

13. A dissolved air flotation clarifier as set forth in claim 8, wherein:
    (a) said recycle header is operably connected to a recycle pump.

14. A dissolved air flotation clarifier as set forth in claim 13, wherein:
    (a) said recycle pump is operably connected to a saturator.

15. A dissolved air flotation clarifier for removing impurities from a liquid to be clarified, said dissolved air flotation clarifier comprising:
    (a) a housing having an inlet for receiving a liquid to be clarified, said housing further having a reaction zone, a clarification zone and an effluent channel;
    (b) said reaction zone having at least one saturated water distributor and at least one dissolved air flotation nozzle operably connected to said at least one saturated water distributor to receive saturated water from said at least one saturated water distributor, said dissolved air flotation nozzle being configured to release micro-bubbles from the saturated water so that the micro-bubbles can mix with the liquid to be clarified to remove impurities from the liquid to be clarified;
    (c) said clarification zone being formed by at least first and second walls, said first wall being disposed on one side of said clarification zone and said second wall being disposed on an opposite side of said clarification zone, said first wall being disposed adjacent said reaction zone; and,
    (d) a baffle being disposed in said clarification zone to re-direct flow of micro-bubbles and liquid toward said first wall, said effluent channel is disposed directly adjacent said first wall.

16. A dissolved air flotation clarifier as set forth in claim 15, wherein:
    (a) said baffle extends generally horizontally from said second wall.

17. A dissolved air flotation clarifier as set forth in claim 15, wherein:
    (a) said baffle is disposed above an inlet of said effluent channel.

18. A method of clarifying a liquid with a dissolved air flotation clarifier for removing impurities from the liquid to be clarified, said method comprising the steps of:
    (a) providing a housing having an inlet for receiving liquid to be clarified, said housing further having a reaction zone, a clarification zone and an effluent channel;
    (b) providing said reaction zone with at least one saturated water distributor and at least one dissolved air flotation nozzle operably connected to said at least one saturated water distributor to receive saturated water from said at least one saturated water distributor, said dissolved air flotation nozzle being configured to release micro-bubbles from the saturated water so that the micro-bubbles can mix with the liquid to be clarified to remove impurities from the liquid to be clarified; and,
    (c) providing a conduit for removing a portion of liquid and micro-bubbles from said clarification zone upstream of said effluent channel.

19. A method as recited in claim 18, further including the steps of:
    (a) providing a saturator operably associated with said saturated water distributor; and,
    (b) directing the portion of liquid and micro-bubbles removed by said conduit to said saturator.

\* \* \* \* \*